Dec. 20, 1932.    J. C. KROESEN    1,891,386
SOUND REPRODUCING APPARATUS
Filed Oct. 14, 1931    2 Sheets-Sheet 1
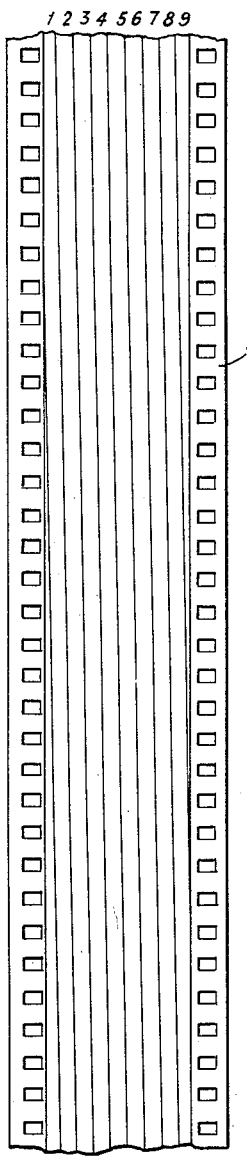
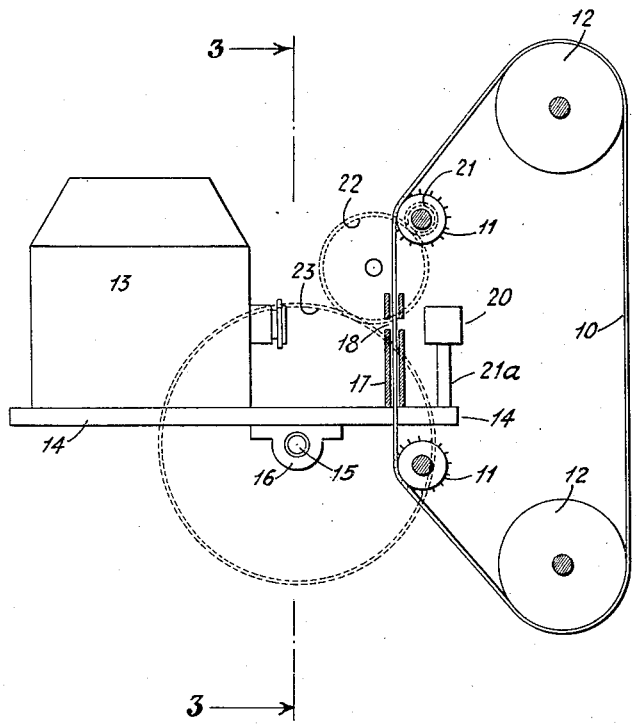
INVENTOR
JAY C. KROESEN
BY *Herbert Haugen*
ATTORNEY Dec. 20, 1932.    J. C. KROESEN    1,891,386
SOUND REPRODUCING APPARATUS
Filed Oct. 14, 1931    2 Sheets-Sheet 2

INVENTOR
JAY C. KROESEN
BY
ATTORNEY

Patented Dec. 20, 1932

1,891,386

UNITED STATES PATENT OFFICE

JAY CLEIS KROESEN, OF BELLEVILLE, NEW JERSEY, ASSIGNOR, BY MESNE ASSIGNMENTS, TO RADIO CORPORATION OF AMERICA, OF NEW YORK, N. Y., A CORPORATION OF DELAWARE

SOUND REPRODUCING APPARATUS

Application filed October 14, 1931. Serial No. 568,727.

This invention relates to sound records and more particularly to light sensitive sound records which are formed on a flexible transparent film.

The subject matter of this application is disclosed in an application filed April 7, 1928, Serial No. 268,090, Patent No. 1,776,123, September 16, 1930.

In the reproduction of sound waves by means of a record of the above type, a film is employed having variable light transmission properties by means of which a light ray of variable intensity is impressed upon a light sensitive cell. The variations in the light ray produce corresponding variations in an electric current which is passed through the cell and may be utilized for the operation of any well known type of electro-magnetic sound reproducing unit.

In accordance with the present invention a plurality of relatively narrow sound record strips are located side by side on a flexible film as for example a standard motion picture projection film. Apparatus associated with said film is arranged to pass light through a single record strip which may be selected at the will of the operator. In accordance with the invention an endless film is provided with the record strip arranged in the form of a helix thereabout. The source of light and light sensitive apparatus in this case are continually moved transversely of the film as the helix of the record strip progresses. The arrangement may be such that the film is synchronized with the picture being projected, and may be adapted to play through a single reel or through an entire performance depending upon the relationship of the various parts.

The invention also consists in certain new and original features of construction and combinations of parts hereinafter set forth and claimed.

Although the novel features which are believed to be characteristic of this invention will be particularly pointed out in the claims appended hereto, the invention itself as to its objects and advantages, the mode of its operation and the manner of its organization may be better understood by referring to the following description taken in connection with the accompanying drawings forming a part thereof, in which Fig. 1 is a front elevation of the film showing the record strips incorporated thereon;

Fig. 2 is a side elevation of sound reproducing apparatus constructed in accordance with this invention.

Like reference characters denote like parts in the several figures of the drawings.

Figure 3:
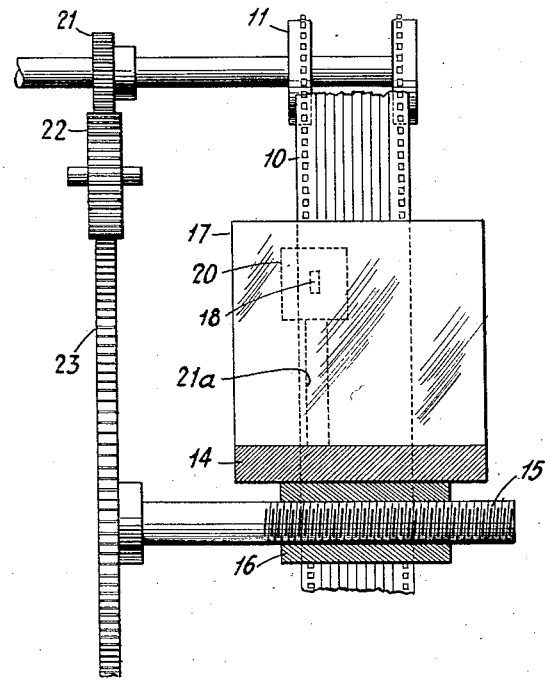
Fig. 3 is a section taken along the line 3—3 of Fig. 2 showing the record film and the light aperture together with the driving mechanism.

In the following description and in the claims parts will be identified by specific names for convenience, but they are intended to be as generic in their application to similar parts as the art will permit.

Referring to the drawings more in detail, a motion picture film 10 of well known construction is shown in Fig. 1 having sound record channels or strips represented thereon at 1 to 9. These channels are formed obliquely of the film and extend progressively therearound in the form of a helix. The sound record strips comprise light and dark sections which are formed in any well known manner to represent sound vibrations and are capable of passing a variable beam of light.

Film 10, as shown more in detail in Figs. 2 and 3, may be passed around a pair of driving sprockets 11 and cooperating reels 12 which may be suitably placed for maintaining the film in its desired formation. The light projecting apparatus comprising a lamphouse 13 is supported on platform 14 which may be moved laterally as by screw 15, threaded bearing 16 being secured to base 14 in engagement with said screw. Aperture plates 17 are supported by base 14 on opposite sides of the film 10 and are provided with apertures 18 of proper formation to confine the transmitted ray of light to a single sound record strip.

Light sensitive cell 20 supported in any convenient manner as by member 21ª from base 14 is suitably positioned to receive light projected from lamp house 13 which passes through aperture 18 of aperture plate 17. Light sensitive cell 20 is capable of receiving the varying ray of light passing through aperture 18 and translating said light into a pulsating electric current in a manner which is well known in the art. The electric current may then be utilized for the projection of sound waves in any convenient manner.

Screw 15 is suitably synchronized with sprockets 11 for causing a transverse movement of aperture 18 and associated apparatus so that said aperture follows the helical sound record strips as the film is advanced. One method of synchronization has been indicated diagrammatically as gear 22 meshing with a pinion 21 carried by sprocket 11, and driving gear 23 associated with screw 15. The ratio of speed of sprocket 11 to that of screw 15 obviously depends upon the width of the record strips and the total length of the endless film.

The arrangement above described may be operated simultaneously with the projection of a motion picture. The sound record may comprise reproductions of the voices of the actors or may include orchestral selections which ordinarily accompany the picture. In the latter case the device is particularly useful in enabling small theatres to be equipped with apparatus for reproducing large orchestras which frequently accompany showings of the picture in the larger theatres. The sound record film would be shipped with the picture film and affords a simple means for insuring that the proper music accompanies the picture. Obviously it is equally useful in reproducing appropriate sounds to accompany the depicted action, such as music or speech, and may be employed wherever sound sequences are to be reproduced.

Figure 4:
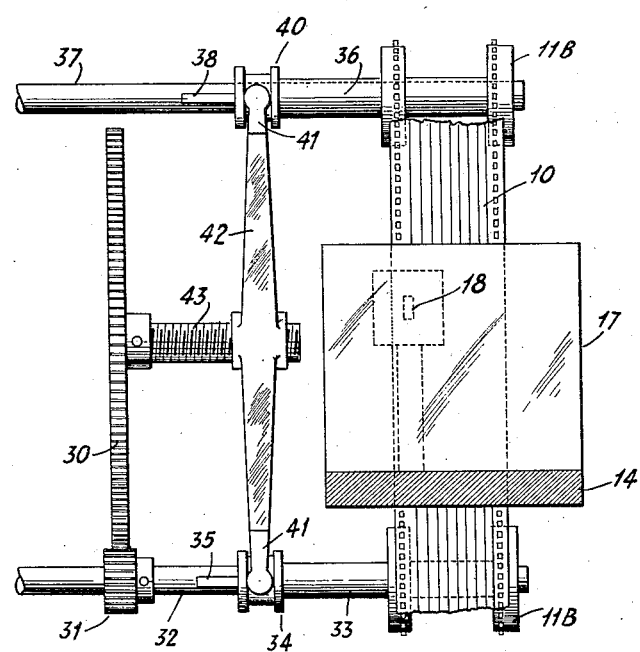
Fig. 4 is an elevation of a modified form of apparatus in which the light aperture is stationary and the film is progressively moved in a lateral direction.

Referring to the arrangement shown in Fig. 4, a mechanism is shown comprising an aperture plate 17 which is mounted upon a suitable stationary framework 14 and provided with an aperture 18 for the purpose above described. Film 10 is carried upon sprockets 11B. One of said sprockets, may be driven by suitable gear train comprising spur gear 30 and pinion 31. Pinion 31 may be secured to shaft 32 on which is loosely mounted sleeve 33 carrying collar 34 and sprocket 11B. Sleeve 33 may be slidably secured on shaft 32 but caused to rotate in connection therewith by any suitable means such as key 35. Sprocket 11B having sleeve 36 and collar 40 associated therewith may be slidably supported on rod 37 as by key 38.

Collars 34 and 40 are engaged by yokes 41 carried upon spanner 42 in which screw 43 is threaded. Screw 43 is secured to and adapted to turn with spur gear 30. The relationship of the pitch of screw 43 to the gear ratio of gear 30 and pinion 31 is such that collars 34 and 40 together with their associated sleeves and sprockets are moved laterally by an amount adapted to maintain aperture 18 of aperture plate 17 in alignment with the helical sound record strip as the film is progressively advanced.

This arrangement operates in a manner similar to that described in connection with Figs. 2 and 3, although in this case the aperture plate and projecting apparatus remain stationary and the film is shifted laterally as it advances. The essential feature, however, is to obtain progressive relative movement between the film and the aperture whereby the light ray may be always projected through a single record strip.

The above described invention permits a motion picture film of standard size to be employed as a sound record whereby various standard parts may be used in connection therewith although the use of a film of this size is not essential. The aperture plate is shifted laterally with respect to the film, continuously and a plurality of records are superimposed upon the same film and the total length of film required is correspondingly decreased.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In combination with a continuous transparent light sensitive film having a plurality of sound records thereon arranged in parallel relationship with respect to each other and progressively spaced across said film to form a continuous helical record, a source of light rays, and means for causing said rays to pass through a single record, a light sensitive cell adapted to receive and translate said rays into an electric current, and means for relatively moving said film and said light rays whereby said rays are caused to follow one of said records.

2. A phonographic apparatus including means arranged to support an endless record medium, a light source, a member provided with a light slit arranged to restrict the light applied to said record medium from said source, and means including a gear train arranged between said support and said source and member to move said record medium longitudinally of its length dimension and to move said slit and source transversely of said dimension.

3. A phonographic apparatus including means arranged to support an endless transparent strip having a helical sound record thereon, a light source, a light sensitive cell, a light slit member for restricting the light transmitted from said source through said record to said cell, a support for said member and said cell, and driving means interposed between said supports for moving said strip longitudinally of its length dimension and for moving said slit and said cell transversely of said dimension.

4. A phonographic apparatus including means for moving an endless helical sound record strip longitudinally of its length dimension, a light source, a light sensitive cell, a member provided with a light slit arranged to restrict the light transmitted from said source through said strip to said cell, and means for moving said source, said slit and said cell transversely of said dimension.

JAY CLEIS KROESEN.